(12) United States Patent
Stubbs et al.

(10) Patent No.: US 8,179,598 B1
(45) Date of Patent: May 15, 2012

(54) SCANNING WIDE FIELD TELESCOPE (SWIFT) SPACEFLIGHT-DEPLOYED PAYLOAD

(75) Inventors: David Stubbs, Mountain View, CA (US); Alan Duncan, Sunnyvale, CA (US); Kenneth R. Lorell, Los Altos, CA (US); Howard C. Holmes, Boulder Creek, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 371 days.

(21) Appl. No.: 12/541,110

(22) Filed: Aug. 13, 2009

Related U.S. Application Data

(60) Provisional application No. 61/099,508, filed on Sep. 23, 2008.

(51) Int. Cl.
*G02B 23/08* (2006.01)
*G02B 23/00* (2006.01)
(52) U.S. Cl. .................. 359/405; 359/399; 359/408
(58) Field of Classification Search .......... 359/399–408, 359/850–853, 896
See application file for complete search history.

(56) References Cited

U.S. PATENT DOCUMENTS

| | | | | |
|---|---|---|---|---|
| 5,898,529 A | * | 4/1999 | Meyer et al. | 359/853 |
| 6,016,999 A | * | 1/2000 | Simpson et al. | 244/159.5 |
| 6,191,757 B1 | * | 2/2001 | Bassily et al. | 343/915 |
| 7,782,530 B1 | * | 8/2010 | Krumel et al. | 359/399 |
| 7,791,553 B2 | * | 9/2010 | Conrad | 343/761 |
| 2005/0183377 A1 | * | 8/2005 | Johnson | 52/646 |

* cited by examiner

*Primary Examiner* — Thong Nguyen
(74) *Attorney, Agent, or Firm* — McDermott Will & Emery LLP

(57) ABSTRACT

A telescope comprises a folding reflector comprising a plurality of sections configured to fold at a plurality of substantially parallel hinges, a support structure configured to support at least two of the plurality of sections of the folding reflector and further configured to fold at one of the plurality of substantially parallel hinges, a corrector assembly configured to deploy from a stowed position in which an optical axis of the corrector assembly is substantially parallel to the parallel hinges to a deployed position in which the optical axis is substantially perpendicular to the folding reflector when the folding reflector is deployed. The telescope further comprises a hexapod configured to stow and deploy the corrector assembly.

14 Claims, 12 Drawing Sheets

SCANNING WIDE FIELD TELESCOPE (SWIFT) SPACEFLIGHT-DEPLOYED PAYLOAD

CROSS-REFERENCE TO RELATED APPLICATIONS

The present application claims the benefit of priority under 35 U.S.C. §119 from U.S. Provisional Patent Application Ser. No. 61/099,508, entitled "SCANNING WIDE FIELD TELESCOPE SPACEFLIGHT-DEPLOYED PAYLOAD," filed on Sep. 23, 2008, which is hereby incorporated by reference in its entirety for all purposes.

STATEMENT REGARDING FEDERALLY SPONSORED RESEARCH OR DEVELOPMENT

Not applicable.

FIELD OF THE INVENTION

The present invention generally relates to wide-field telescopes and, in particular, relates to scanning wide field telescope (SWIFT) spaceflight-deployed payloads.

BACKGROUND OF THE INVENTION

Space-borne wide-field telescopes are used in a variety of communications and imaging applications, and enjoy a number of advantages over telescopes with narrower fields of regard (FOR). Some wide field telescopes are capable of scanning large fields of regard, either by repositioning the telescope's primary mirror or reflector, or by repositioning a secondary mirror assembly in front of the reflector. These features come at a cost of increased size, mass and complexity, however, which can render such a telescope difficult to deploy in orbit. For example, a large wide-field telescope (e.g., with an aperture greater than 5 meters) may not fit in a single payload launch fairing (PLF), and may accordingly require multiple launch vehicles to orbit component parts that may subsequently require assembly in-orbit.

SUMMARY OF THE INVENTION

Various embodiments of the present invention solve the foregoing problem by providing a scanning wide-field telescope that can be placed into orbit with a single launch vehicle, and which is self-deploying. The telescope has a folding primary mirror with a large aperture and a corrector assembly that is deployed from a stowed position using a hexapod structure. The hexapod structure is also used to reposition the corrector assembly with respect to the primary mirror to rapidly slew the field of regard of the telescope.

According to one embodiment of the present invention, a telescope comprises a folding reflector comprising a plurality of sections configured to fold at a plurality of substantially parallel hinges from a first stowed position to a first deployed position. The telescope further comprises a support structure configured to support at least two of the plurality of sections of the folding reflector and further configured to fold at one of the plurality of substantially parallel hinges from a second stowed position to a second deployed position. The telescope further comprises a corrector assembly configured to deploy from a third stowed position in which an optical axis of the corrector assembly is substantially parallel to the plurality of substantially parallel hinges to a third deployed position in which the optical axis is substantially perpendicular to the folding reflector when the folding reflector is in the first deployed position. The telescope further comprises a hexapod configured to stow and deploy the corrector assembly, the hexapod comprising a first pair of legs connecting the corrector assembly to an upper portion of the support structure, a second pair of legs connecting the corrector assembly to a lower portion of the support structure, and a third pair of legs connecting the corrector assembly to a bus. The first, second and third pair of legs are configured to deploy the corrector assembly from the third stowed position to the third deployed position when the support structure is opened.

It is to be understood that both the foregoing summary of the invention and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
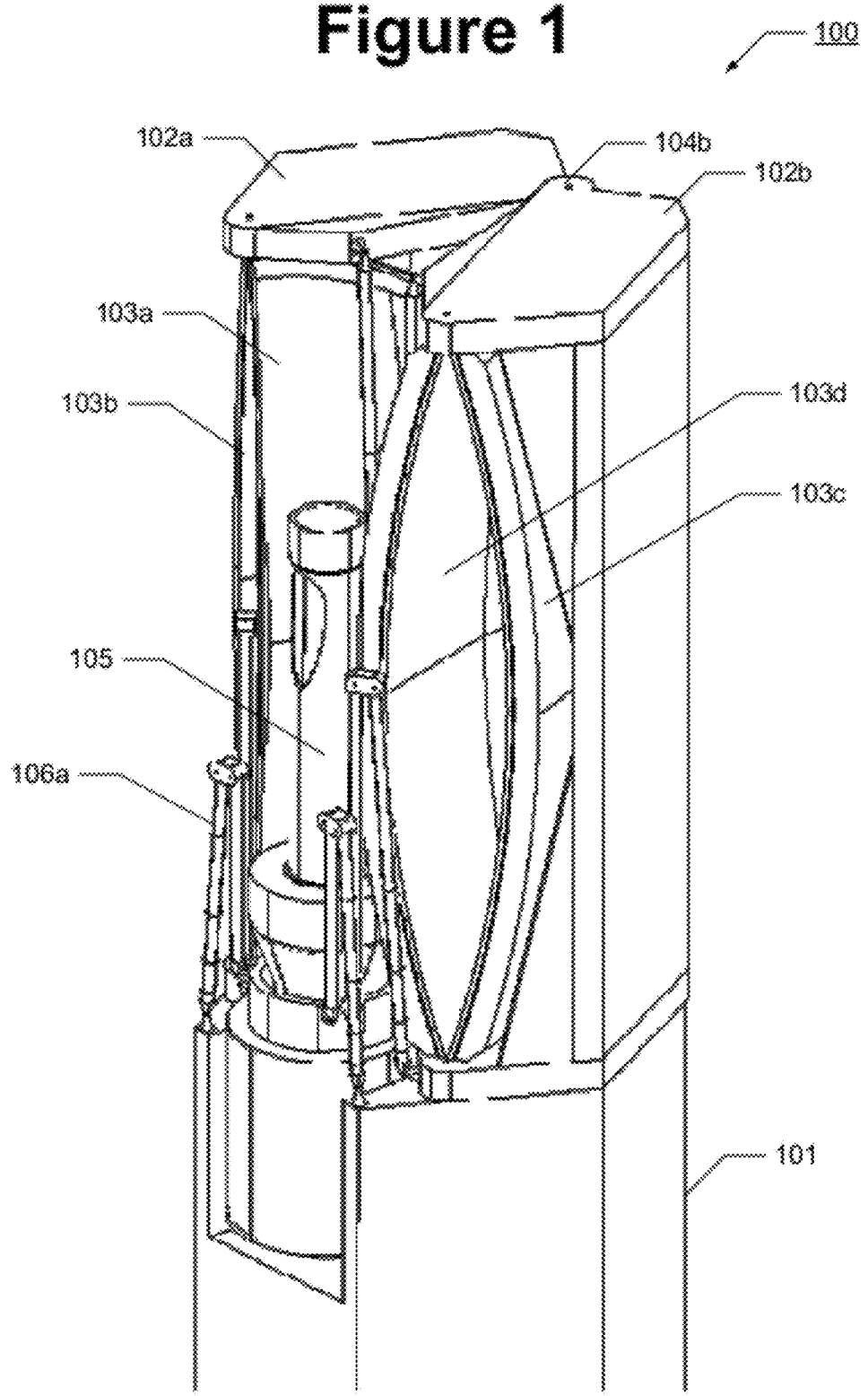
FIG. 1 illustrates a front perspective view of a telescope in a stowed configuration in accordance with one aspect of the subject disclosure.
Figure 2:
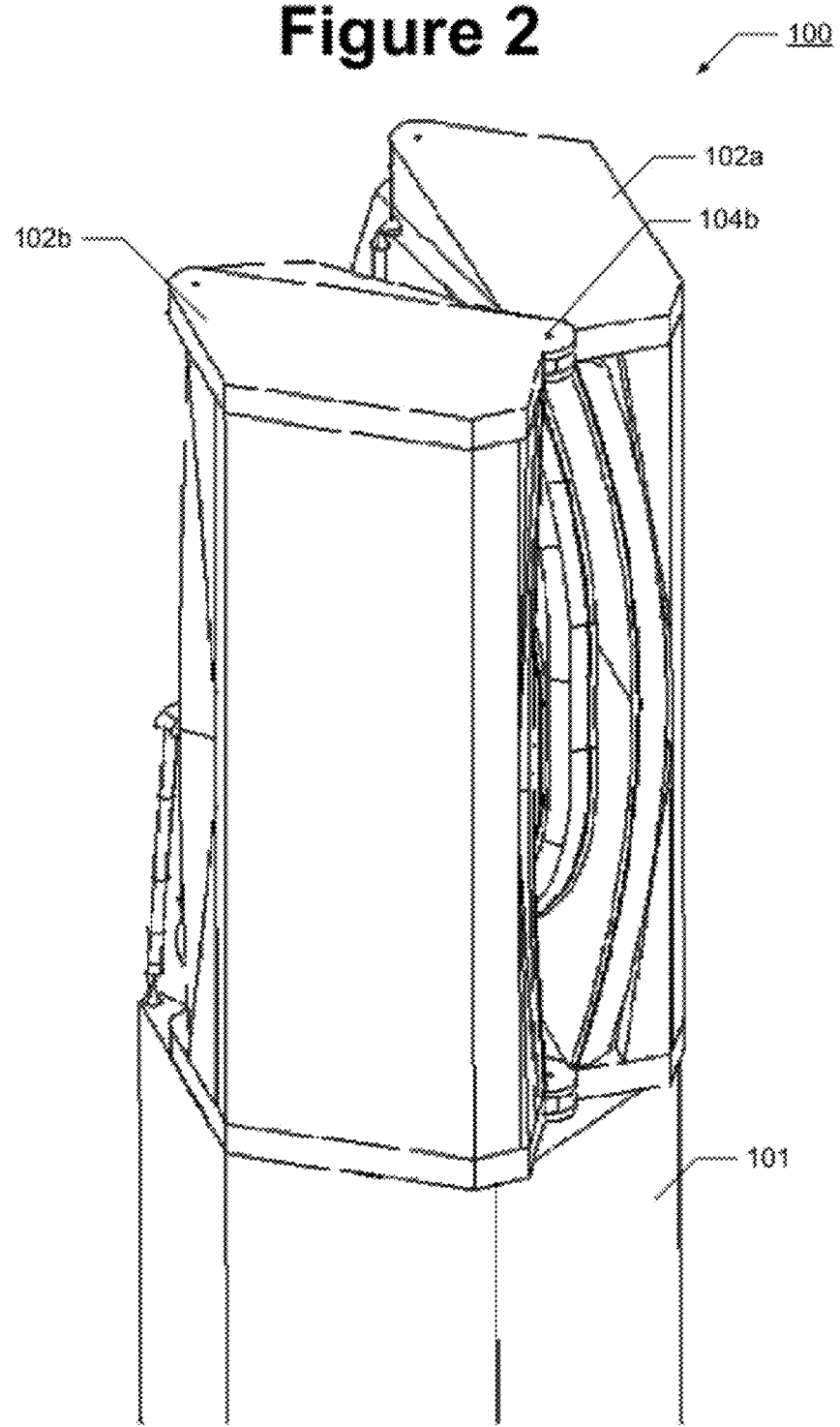
FIG. 2 illustrates a rear perspective view of a telescope in a stowed configuration in accordance with one aspect of the subject disclosure.

FIGS. 1 and 2 illustrate front and rear perspective views of a telescope in a stowed configuration in accordance with one aspect of the subject disclosure. Telescope 100 includes a bus 101 to which is attached a folding support structure or "strongback" comprising two halves 102a and 102b. The support structure is configured to fold and unfold at a hinge 104b from the illustrated stowed position to a deployed position. Coupled to the strongback are several sections of a primary mirror or reflector, including outer sections 103a and 103d, illustrated in FIG. 1, and inner sections 103b and 103c (illustrated in subsequent figures). Telescope 100 further includes a corrector assembly 105 coupled to both bus 101 and halves 102a and 102b of the strongback by a hexapod comprising six legs 106a-106f.

Figure 3:
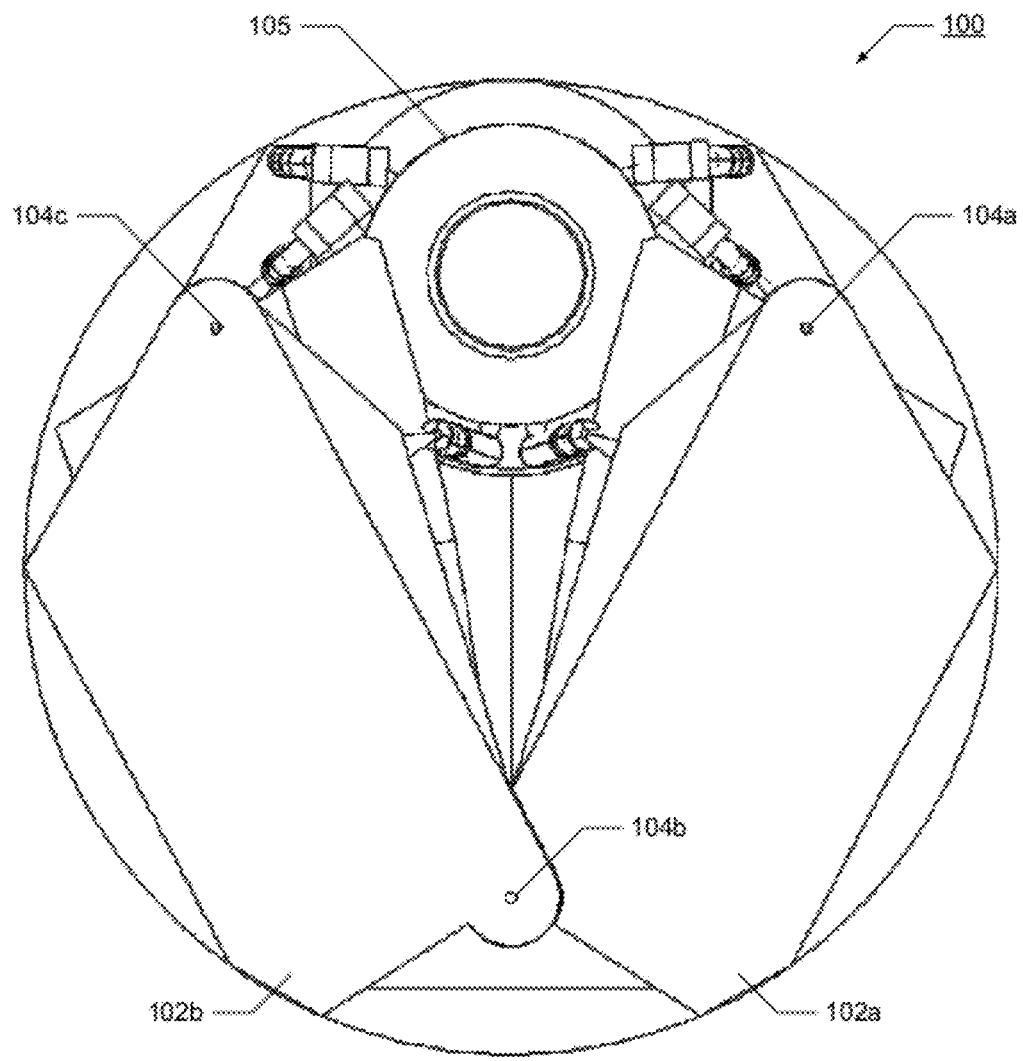
FIG. 3 illustrates an overhead view of a telescope in a stowed configuration in accordance with one aspect of the subject disclosure.

FIG. 3 illustrates an overhead view of telescope 100 in a stowed configuration in accordance with one aspect of the subject disclosure. In the illustrated stowed configuration, telescope 100 is capable of being stowed in a payload launch fairing ("PLF") 5 meters in diameter.

Figure 4:
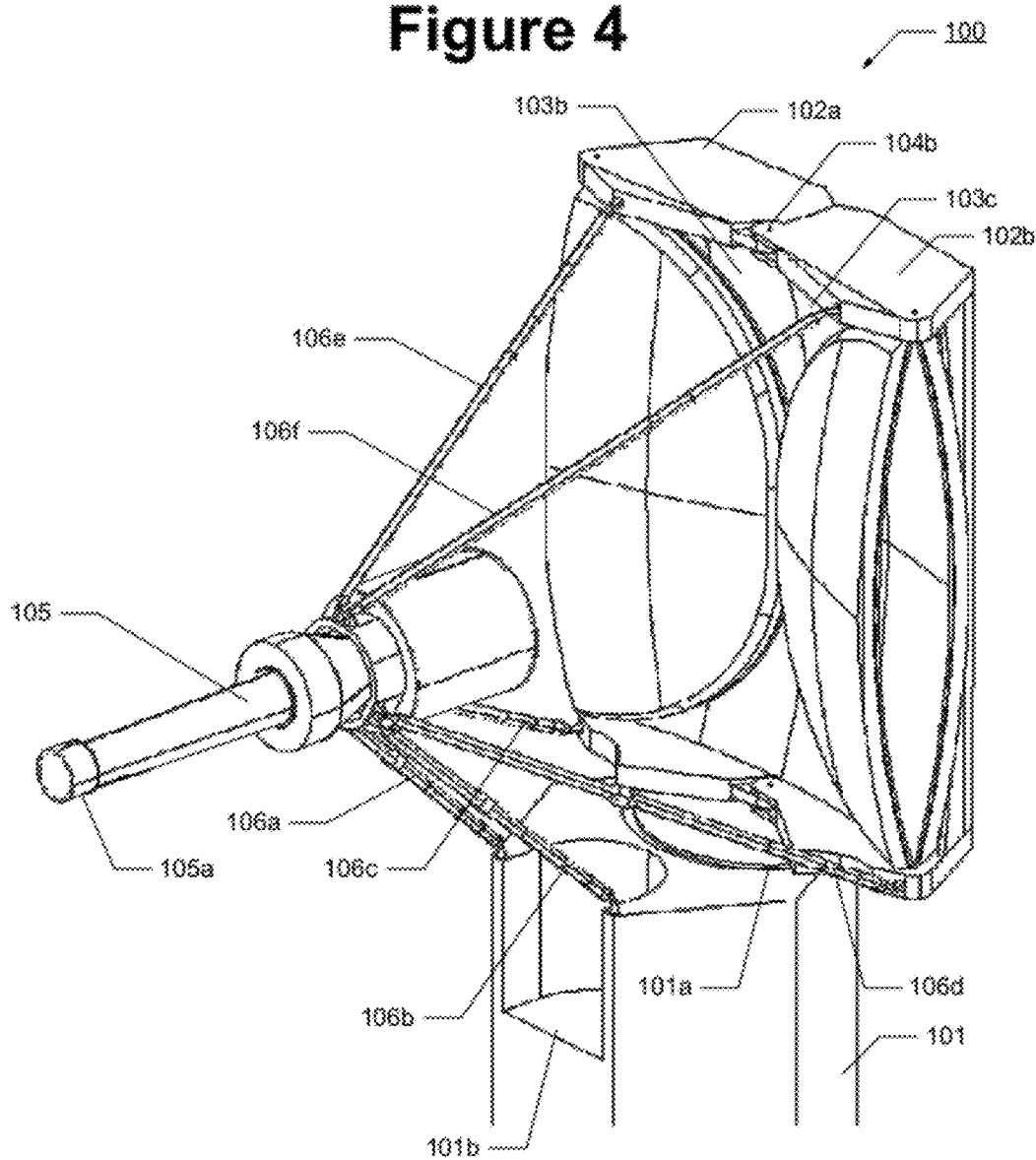
FIG. 4 illustrates a front perspective view of a telescope in a first partially-deployed configuration in accordance with one aspect of the subject disclosure.
Figure 5:
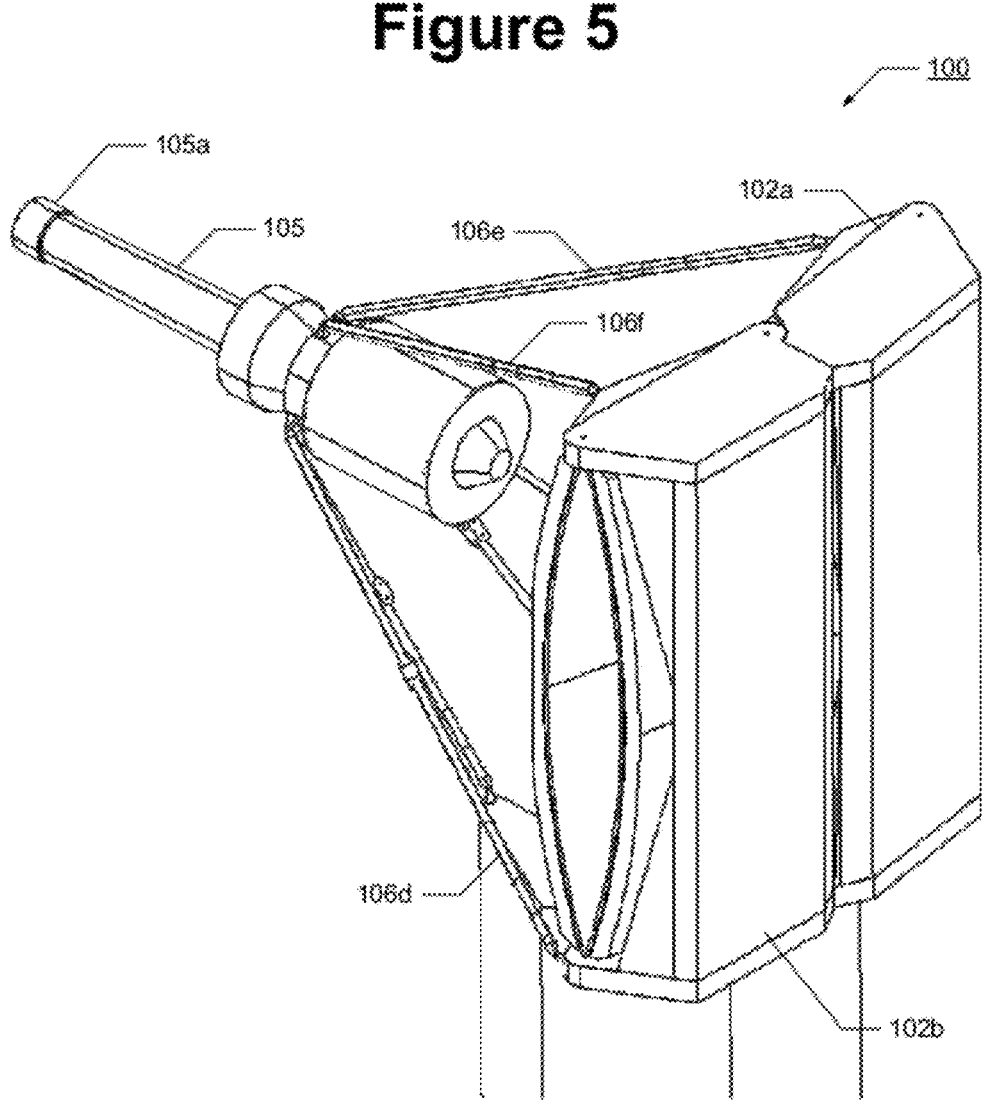
FIG. 5 illustrates a rear perspective view of a telescope in a first partially-deployed configuration in accordance with one aspect of the subject disclosure.

Turning to FIGS. 4 and 5, front and rear perspective views of telescope 100 in a first partially-deployed configuration are illustrated in accordance with one aspect of the subject disclosure. In the first partially-deployed configuration illustrated in FIGS. 4 and 5, the strongback halves 102a and 102b have unfolded along hinge 104b, guided by the track 101a in bus 101. The unfolding of strongback halves 102a and 102b serves to partially unfold the primary mirror, in particular unfolding sections 103b and 103c, which are supported by halves 102a and 102b, respectively, along hinge 104b.

According to various aspects of the subject disclosure, the unfolding of strongback halves 102a and 102b may be driven by any one of a number of mechanisms. For example, in accordance with one aspect of the subject disclosure, a high force spring coupled to strongback halves 102a and 102b may be controllably released using a damper to unfold strongback halves 102a and 102b and to lift collector assembly 105 out of its stowed position into its deployed position. In accordance with other aspects of the subject disclosure, rotary actuators and lenticular struts may be used for deployment. As will be readily understood by those of requisite skill in the art in view of the subject disclosure, any one of a number of other mechanisms may be used to unfold a strongback and deploy a telescope.

Because legs 106c-106f respectively attach corrector assembly 105 to the lower and upper corners of strongback halves 102a and 102b, the unfolding of halves 102a and 102b serves to deploy corrector assembly 105 from its stowed position in a cavity 101b of bus 101 to a position in which the optical axis of corrector assembly 105 is substantially perpendicular to the primary mirror. In this regard, as can be seen with reference to FIG. 4, legs 106a-106d (i.e., the bottom two pair of legs of the hexapod) each have a joint whereby the leg is folded back upon itself when corrector assembly 105 is in the stowed position, and which extend the leg to a substantially linear configuration when corrector assembly 105 is in the deployed position, in accordance with one aspect of the subject disclosure. According to one aspect of the subject disclosure, the cross-sectional diameter of the legs may be about 6 inches, to minimize interference with the signals collected by the primary mirror. According to another aspect of the subject disclosure, the legs may be thin-walled hollow tubes of graphite or a similar light weight material chosen for minimal mass and high stiffness.

In accordance with one aspect of the subject disclosure, the joints in legs 106a-106d may be double-jointed knuckles (e.g., with two hinges spaced at least the cross-sectional diameter of the leg apart from one another), which permit the two portions of each leg to fold back on each other and to lay parallel to one another when stowed. During deployment, the knuckles unfold to straighten the legs. According to one aspect of the subject disclosure, the joints may be driven by an actuator. Alternatively, the deployment of the strongback may provide the motive force to unfold legs 106a-106d with the assistance of lenticular springs in the hinges.

Figure 6:
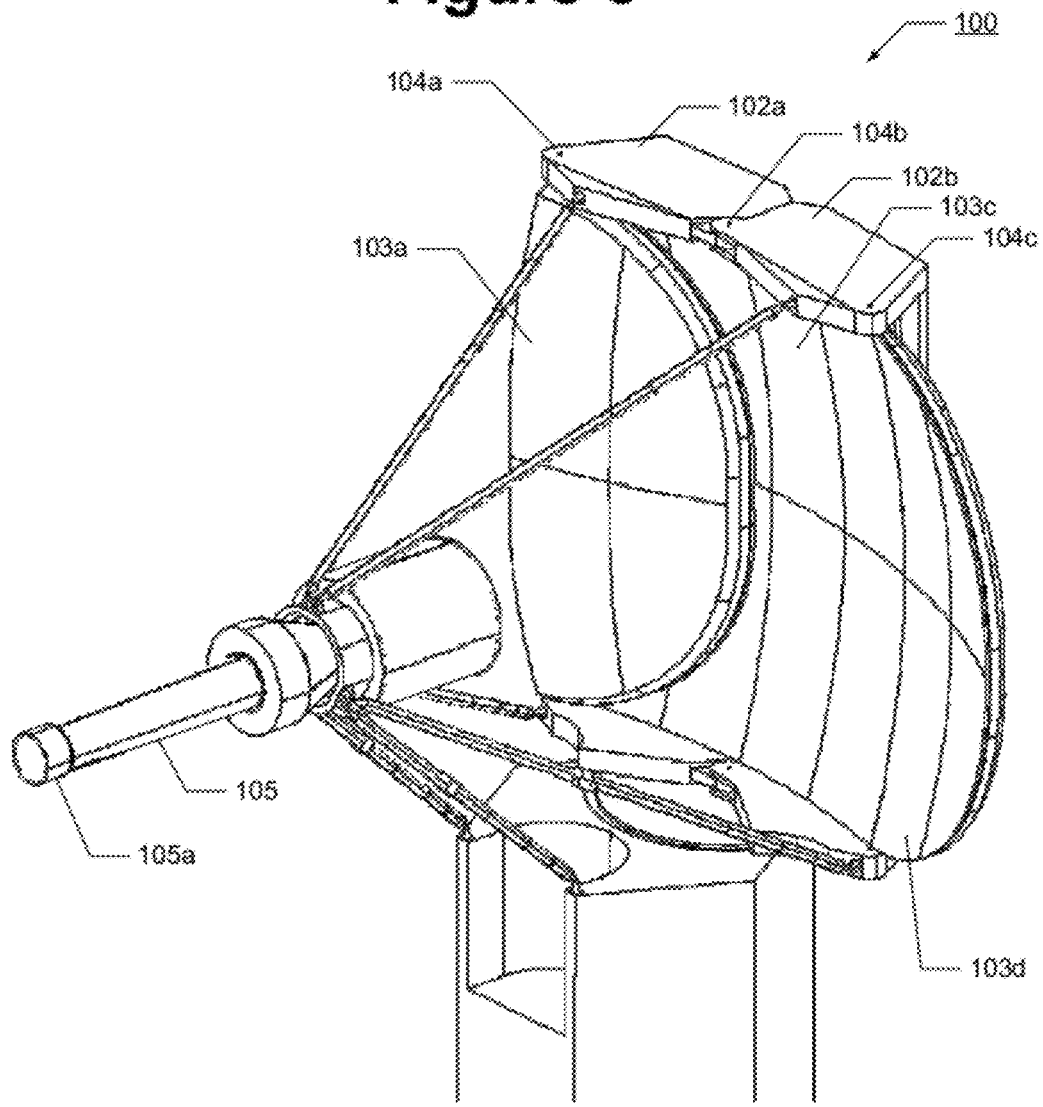
FIG. 6 illustrates a front perspective view of a telescope in a second partially-deployed configuration in accordance with one aspect of the subject disclosure.
Figure 7:
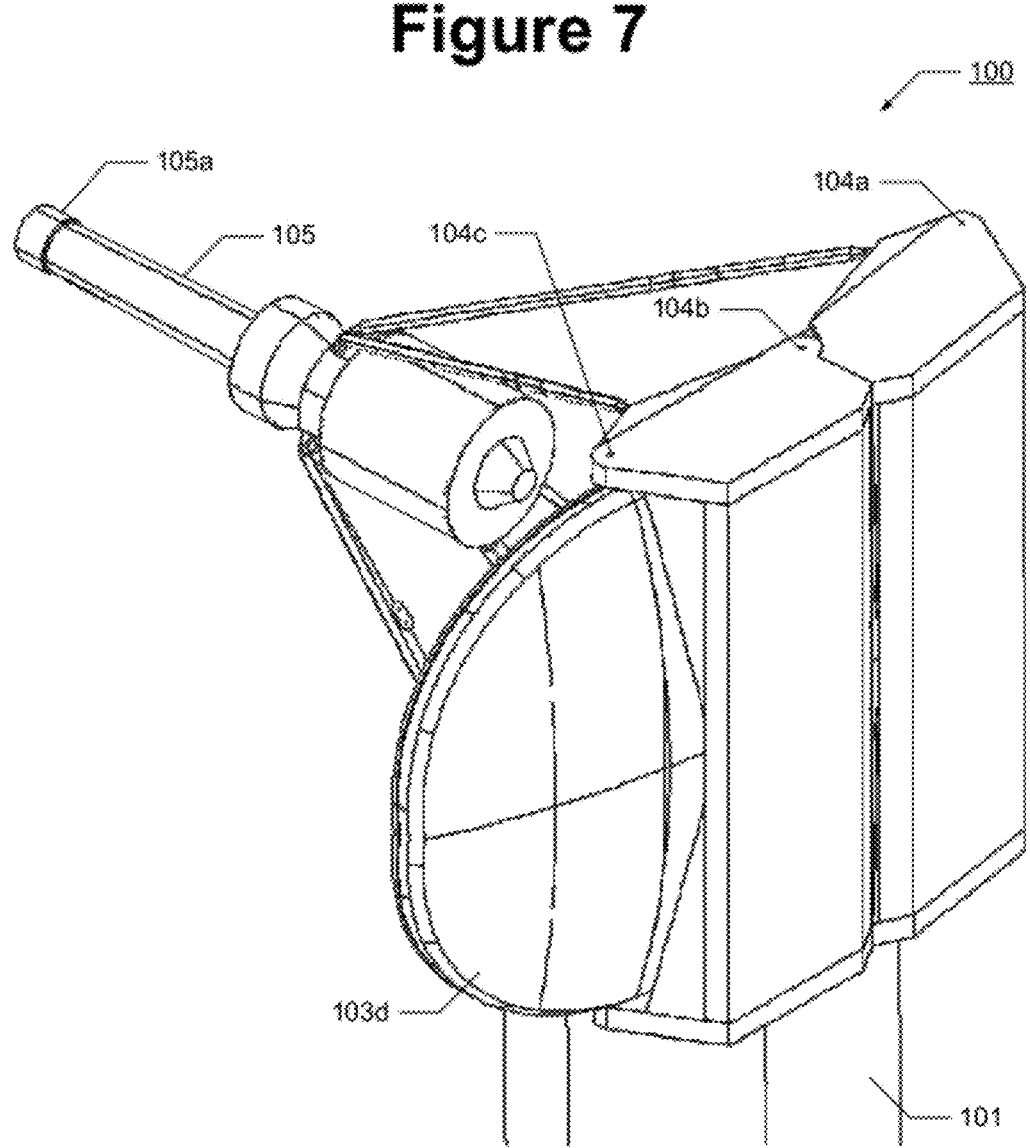
FIG. 7 illustrates a rear perspective view of a telescope in a second partially-deployed configuration in accordance with one aspect of the subject disclosure.
Figure 8:
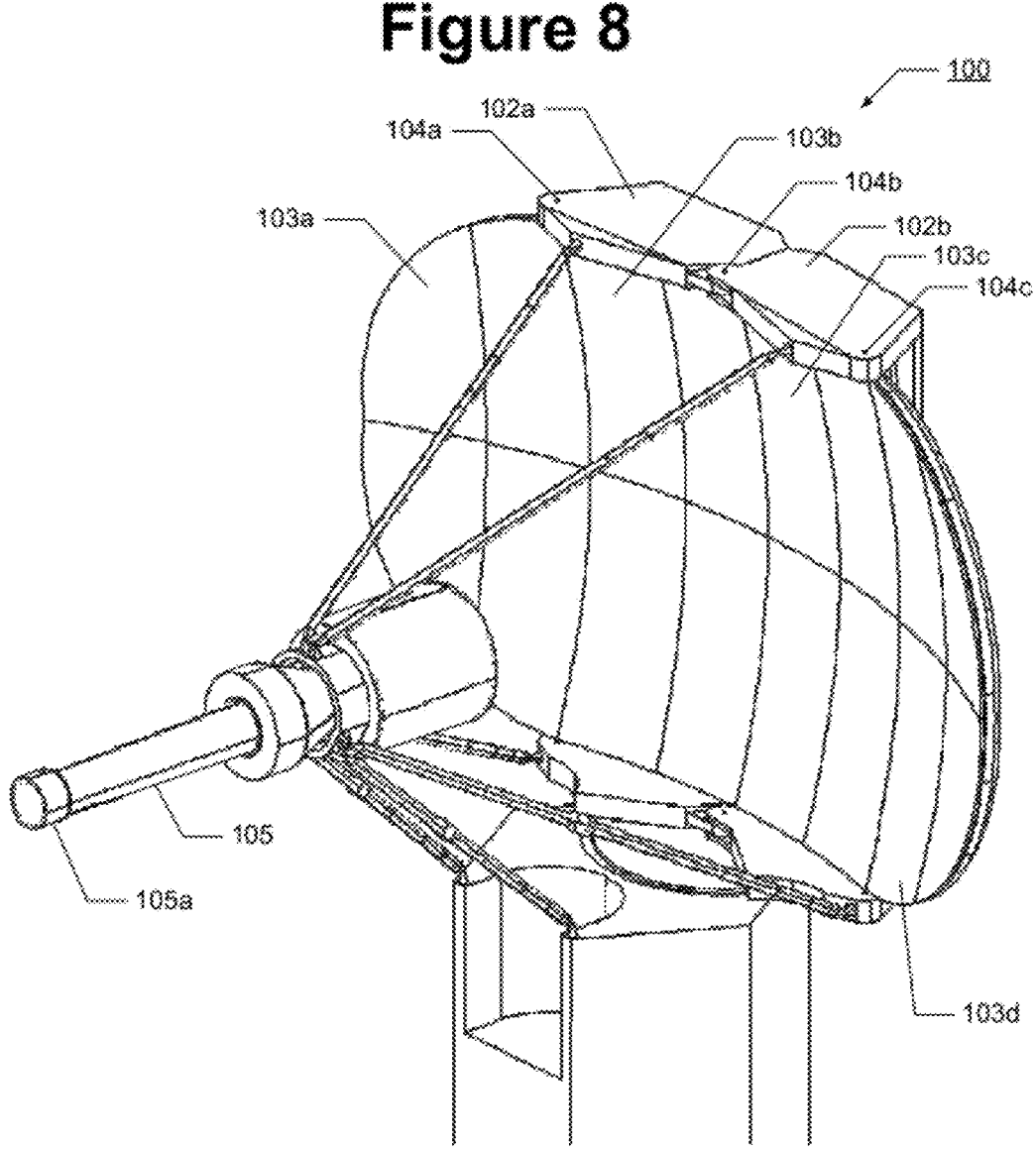
FIG. 8 illustrates a front perspective view of a telescope in a deployed configuration in accordance with one aspect of the subject disclosure.
Figure 9:
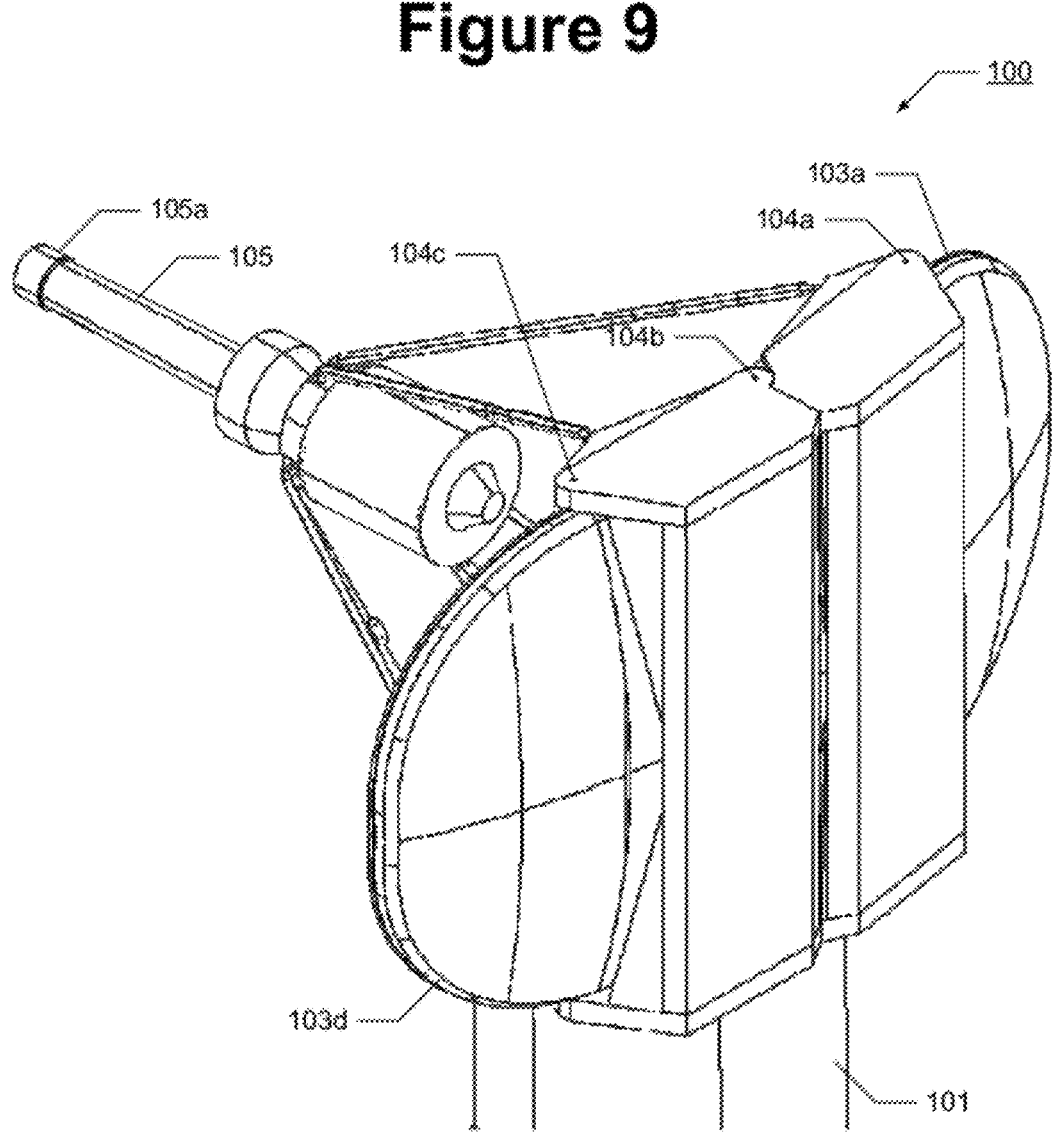
FIG. 9 illustrates a rear perspective view of a telescope in a deployed configuration in accordance with one aspect of the subject disclosure.
Figure 10:
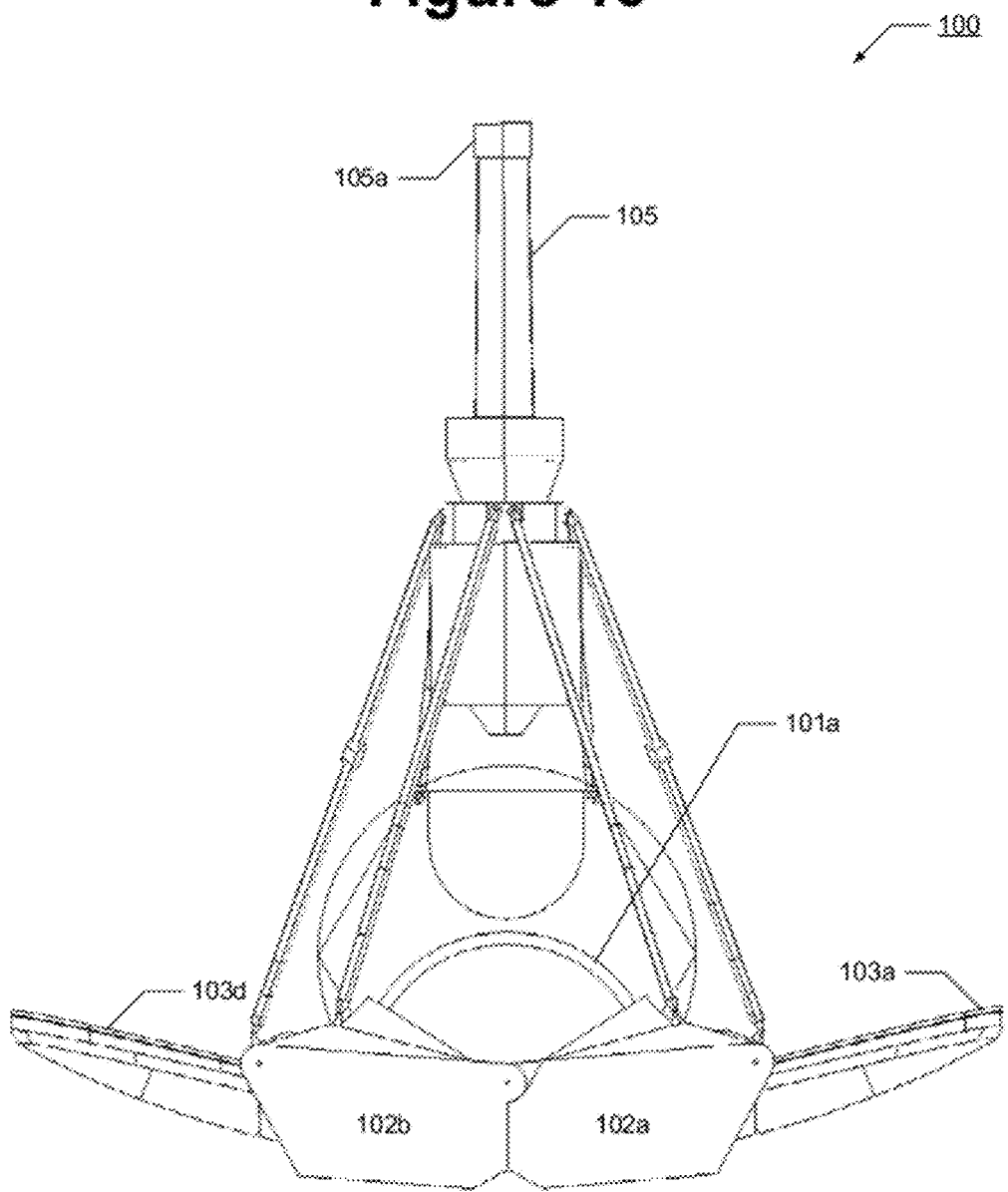
FIG. 10 illustrates an overhead view of a telescope in a deployed configuration in accordance with one aspect of the subject disclosure.
Figure 11:
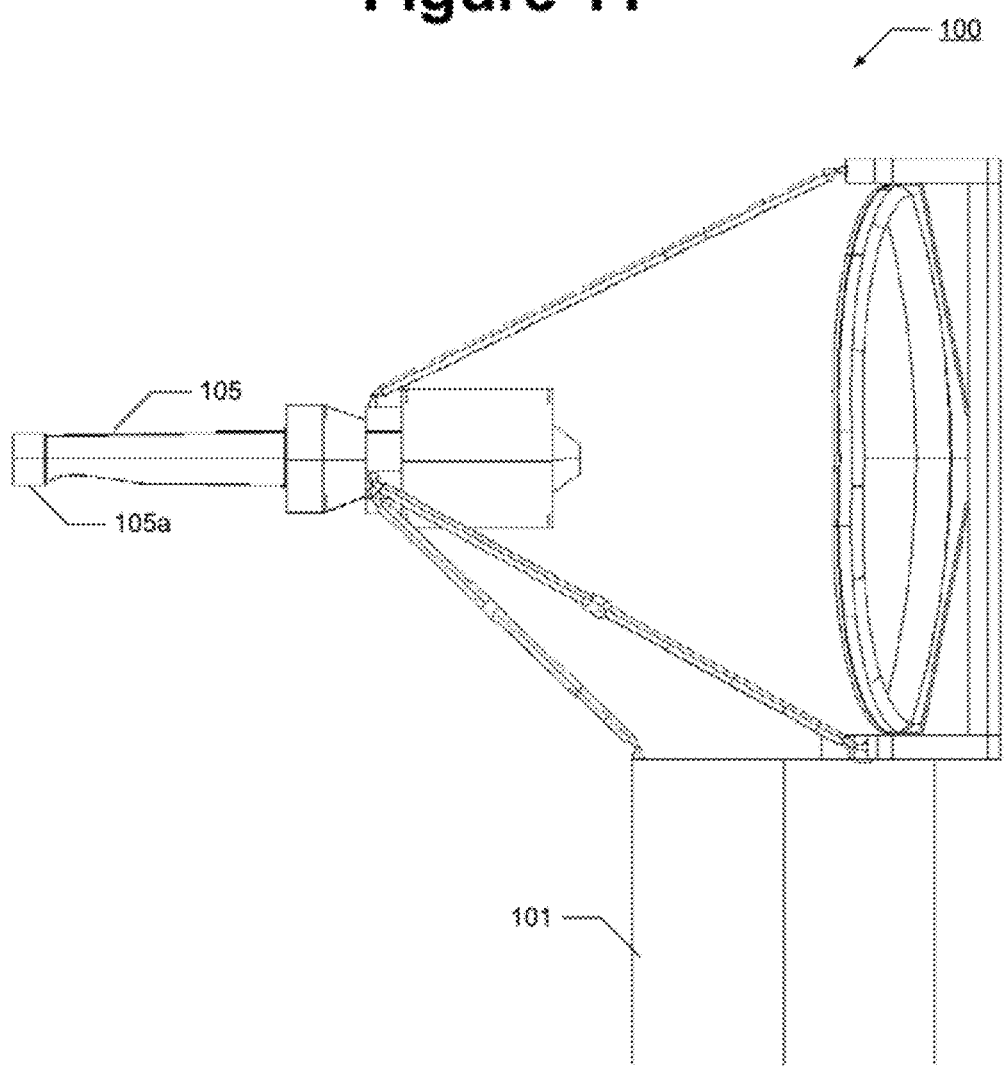
FIG. 11 illustrates a side view of a telescope in a deployed configuration in accordance with one aspect of the subject disclosure.

Turning to FIGS. 6 and 7, front and rear perspective views of telescope 100 in a second partially-deployed configuration are illustrated in accordance with one aspect of the subject disclosure. In this next phase of deployment, section 103d of the primary mirror is unfolded at hinge 104c. Similarly, as is illustrated in FIGS. 8 and 9, in the final phase of deployment, section 103a of the primary mirror is unfolded at hinge 104a. According to one aspect of the subject disclosure, when deployed, the spherical primary mirror of telescope 100 may have an aperture of about 6 meters by 12 meters. FIGS. 10 and 11 illustrate an overhead view and a side view, respectively, of telescope 100 in a deployed configuration in accordance with one aspect of the subject disclosure.

According to various aspects of the subject disclosure, the unfolding of primary mirror sections 103a and 103d may be driven by any one of a number of mechanisms. For example, in accordance with one aspect of the subject disclosure, high force springs coupled to primary mirror sections 103a and 103d may be controllably released using dampers to unfold primary mirror sections 103a and 103d. In accordance with other aspects of the subject disclosure, rotary actuators and lenticular struts may be used for deployment. As will be readily understood by those of requisite skill in the art in view of the subject disclosure, any one of a number of other mechanisms may be used to unfold primary mirror sections of a telescope.

Figure 12:
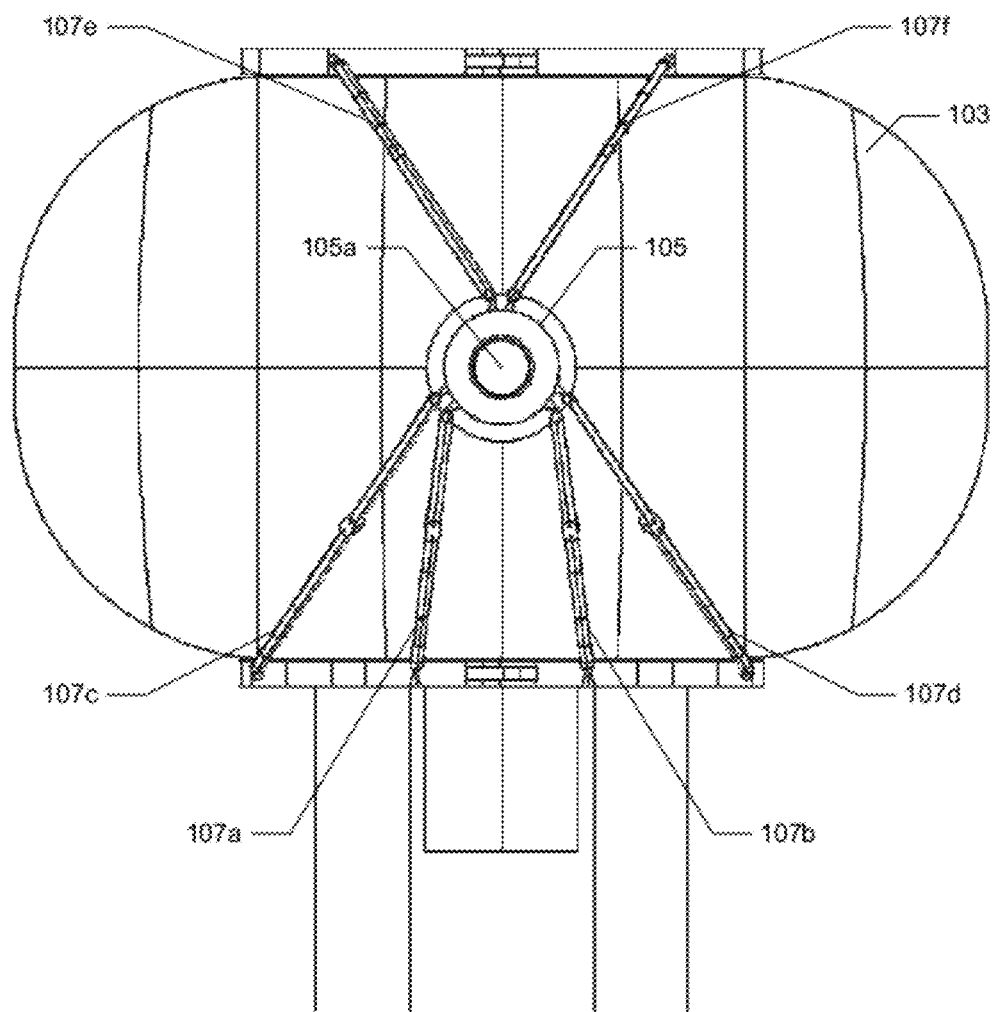
FIG. 12 illustrates a back view of a telescope in a deployed configuration in accordance with one aspect of the subject disclosure.

FIG. 12 illustrates a back view of a telescope in a deployed configuration in accordance with one aspect of the subject disclosure. According to one aspect of the subject disclosure, the hexapod (i.e., legs 106a-106b of telescope 100 serves both to deploy corrector assembly 105 and to adjust the position of corrector assembly 105 with respect to primary reflector 103. In this regard, each leg 106a-106f may include a section 107a-107f which can change in length to allow corrector assembly 105 to move in six degrees of freedom. According to various aspects of the subject disclosure, expanding and contracting sections 107a-107f may comprise any one of a number of mechanisms for expanding and contracting, including, for example, jack screws, stacked voice coils, inch worms, PZT actuators, or the like.

By adjusting the lengths of sections 107a-107f, corrector assembly 105 can be slewed around in a spherical arc to rapidly change the field of regard of telescope 100. In this regard, corrector assembly 105 may include an optical element, such as a fast steering mirror 105a, at one end thereof, remote from primary mirror 103. According to one aspect of the subject disclosure, the hexapod supporting corrector assembly 105 enjoys a graceful degradation even if one or more of the expanding and contracting sections 107a-107f fail, as the remaining legs of the hexapod may retain the ability to compensate for the failure.

In accordance with one aspect of the subject disclosure, the hexapod may be configured to maintain a position of fast steering mirror 105a with respect to primary mirror 103 while slewing the rest of corrector assembly 105 around. To counteract the gross motion of the hexapod, fast steering mirror 105a may be mounted on a second-stage actuator (e.g., tip/tilt) to ensure that fast steering mirror 105a remains in optical alignment with a focal plane assembly (not illustrated) in bus 101.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A telescope comprising:
    a folding reflector comprising a plurality of sections configured to fold at a plurality of substantially parallel hinges from a first stowed position to a first deployed position;
    a support structure configured to support at least two of the plurality of sections of the folding reflector and further configured to fold at one of the plurality of substantially parallel hinges from a second stowed position to a second deployed position;
    a corrector assembly configured to deploy from a third stowed position in which an optical axis of the corrector assembly is substantially parallel to the plurality of substantially parallel hinges to a third deployed position in which the optical axis is substantially perpendicular to the folding reflector when the folding reflector is in the first deployed position; and
    a hexapod configured to stow and deploy the corrector assembly, the hexapod comprising a first pair of legs connecting the corrector assembly to an upper portion of the support structure, a second pair of legs connecting the corrector assembly to a lower portion of the support structure, and a third pair of legs connecting the corrector assembly to a bus, wherein the first, second and third pair of legs are configured to deploy the corrector assembly from the third stowed position to the third deployed position when the support structure is opened.

2. The telescope according to claim 1, wherein each leg of the second and third pairs of legs comprises a joint whereby the leg can be folded back upon itself when the corrector assembly is in the third stowed position.

3. The telescope according to claim 1, wherein each leg of the first and second pairs of legs connects to a corresponding portion of the support structure with a three degree-of-freedom pivot.

4. The telescope according to claim 1, wherein each leg of the third pair of legs connects to a corresponding portion of the bus with a three degree-of-freedom pivot.

5. The telescope according to claim 1, wherein each leg of the first, second and third pair of legs comprises an adjustable-length section whereby the corrector assembly can be slewed during operation of the telescope.

6. The telescope according to claim 5, wherein the corrector assembly comprises a fast steering mirror maintained in a fixed position relative to the reflector while the corrector assembly is slewed.

7. The telescope according to claim 1, wherein the folding reflector comprises four sections configured to fold at three substantially parallel hinges.

8. The telescope according to claim 7, wherein the support structure is configured to support a middle two of the four sections of the folding reflector and is further configured to fold at a middle one of the three substantially parallel hinges.

9. The telescope according to claim 1, wherein the folding reflector has a substantially spherical curvature when in the first deployed position.

10. The telescope according to claim 1, wherein the bus comprises a track configured to guide a movement of the support structure between the second stowed position and the second deployed position.

11. The telescope according to claim 1, wherein the bus comprises a cavity in which a portion of the corrector assembly is disposed when the corrector assembly is in the third stowed position.

12. The telescope according to claim 1, wherein when the folding reflector is in the first stowed position, the support structure is in the second stowed position, and the corrector assembly is in the third stowed position, the corrector assembly fits within a payload launch fairing less than or equal to about 5 meters in diameter.

13. The telescope according to claim 1, wherein the folding reflector has an aperture of about 6 meters by about 12 meters when in the first deployed position.

14. The telescope according to claim 1, wherein each leg of the first, second and third pair of legs has a cross-sectional diameter of about 6 inches.

* * * * *